T. HARRINGTON.
TOASTER.
APPLICATION FILED AUG. 22, 1919.

1,343,129.

Patented June 8, 1920.
2 SHEETS—SHEET 1.

WITNESSES
J. H. Crawford.

INVENTOR.
BY Tillie Harrington,
Victor J. Evans
ATTORNEY.

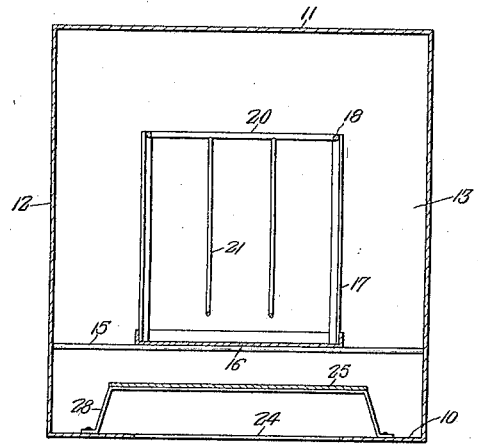
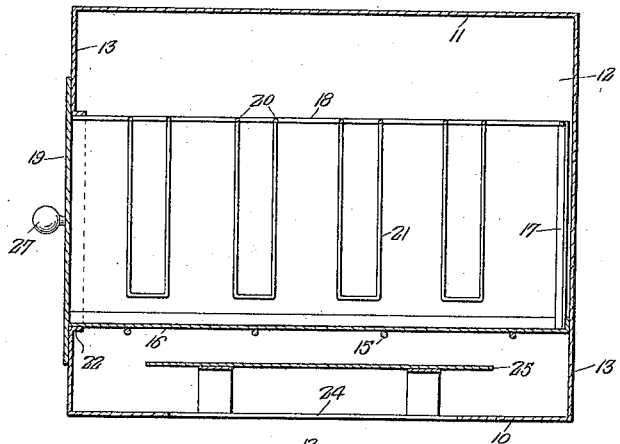
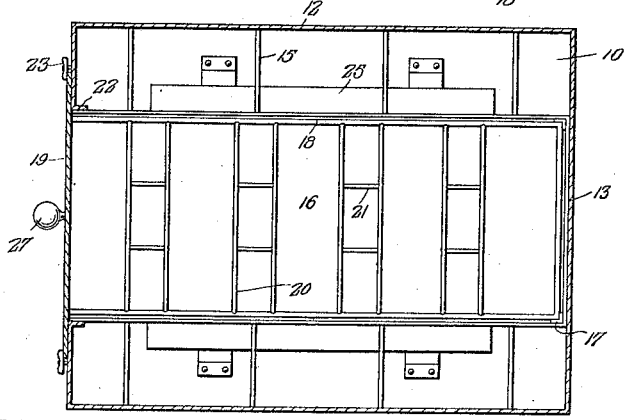

UNITED STATES PATENT OFFICE.

TILLIE HARRINGTON, OF MINNEAPOLIS, MINNESOTA.

TOASTER.

1,343,129.   Specification of Letters Patent.   Patented June 8, 1920.

Application filed August 22, 1919. Serial No. 319,186.

*To all whom it may concern:*

Be it known that I, TILLIE HARRINGTON, a citizen of the United States, residing at Minneapolis, in the county of Hennepin and State of Minnesota, have invented new and useful Improvements in Toasters, of which the following is a specification.

This invention relates to bread toasters, and comprehends a construction wherein the heat is equally distributed on both sides of the slices of bread, thus saving time, fuel, and preventing burning of the bread.

To this end, the invention makes use of a closed receptacle, with which a rack for the slices of bread, is movably associated, means being employed for holding the rack in spaced relation to the bottom of the receptacle, so that the bread will be properly and quickly toasted.

In carrying out my invention, I provide one wall of the receptacle with an opening which is adapted to be arranged over the heater, but arranged within the receptacle above the opening is a baffle plate for distributing the heat as well as the flame from a cook stove from coming in contact with the rack or bread thus preventing burning of either or both.

The nature and advantages of the invention will be better understood when the following detail description is taken in connection with the accompanying drawings, the invention residing in the construction, combination and arrangement of parts as claimed.

In the drawings forming part of this specification, like numerals of reference indicate similar parts in the several views, and wherein—

Fig. 2 is a transverse sectional view, taken on the line 2—2 of Fig. 1.

Fig. 3 is a longitudinal sectional view taken on the line 3—3 of Fig. 1.

Fig. 4 is a horizontal sectional view taken through the receptacle with the rack removed.

Figure 1:
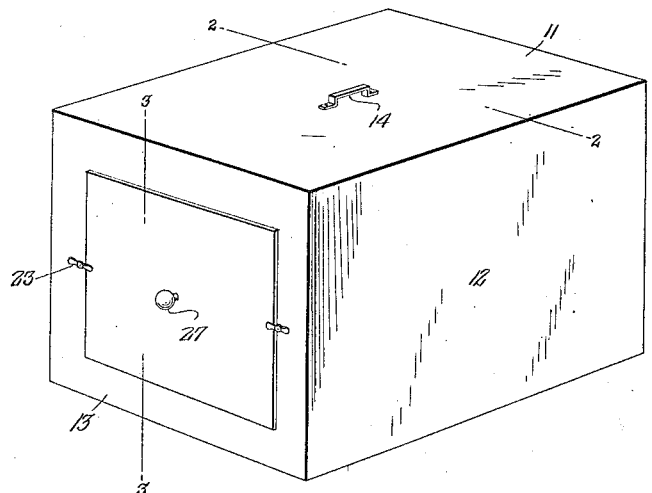
Figure 1 is a perspective view.

The invention embodies a receptacle comprising a bottom wall 10, a top 11, and side and end walls 12 and 13 respectively. The top 11 is provided with a handle 14, by means of which the device in its entirety can be conveniently carried from place to place. Disposed transversely of the receptacle, and connecting the side walls 12 at a point adjacent the bottom of the receptacle, are spaced parallel rods 15, which constitute a support for the bread rack which is to be presently described.

Figure 5:
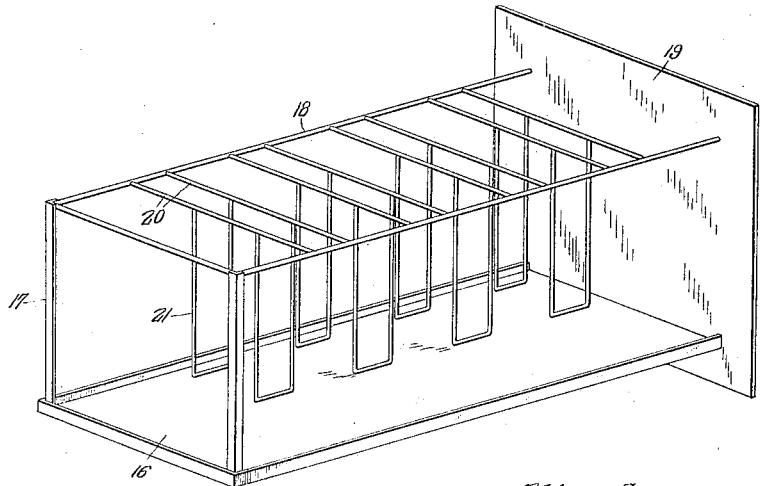
Fig. 5 is a perspective view of the rack.

The rack as disclosed in Fig. 5 embodies a bottom 16 from two corners of which rise the standards 17, the latter being terminally connected with the horizontally disposed rod 18 which projects from a plate 19 arranged at the opposite end of the rack. Connecting the rods 18 are transversely disposed wire elements 20, the latter being arranged in pairs and the elements of each pair being spaced a slight distance, sufficient to permit the insertion therebetween of a slice of bread. Depending from each pair of elements 20 are wire loops 21 which are of a sufficient length to support the slice of bread when positioned between the element 20, loops 21 terminating a slight distance from the bottom 16 of the rack. The rack is adapted to be positioned within the receptacle through an opening 22, in one of the end walls of the receptacle, and when positioned within the latter, the bottom 16 rests upon the transverse bars 15, while the plate 19 of the rack constitutes a cover for the opening 22. The cover 19 is of a size to project beyond the edges of the opening 22, and suitable fastening elements 23 are carried by the said end walls for engagement with the cover 19, to hold the rack in movable position within the receptacle.

The bottom of the receptacle is provided with an enlarged opening 24 which is adapted to be placed over a heater of any suitable character. In other words, the toaster may be used with an electric heater, the gas stove or the ordinary cook stove, in the latter instance, one of the covers of the stove is removed and the opening 24 arranged immediately over the fire. The baffle plate 25, is supported within the receptacle immediately above the opening 24, by means of substantially inverted U-shaped brackets 28, the terminals of which are laterally disposed and suitably secured to the bottom 10 of the receptacle. It will be noted that the baffle plate 25 is spaced from the bottom 10 of the receptacle and from the transverse rods 18, an arrangement which permits the heat to be equally distributed in the receptacle, so that the bread has its entire area properly toasted in quick order. The baffle plate also prevents the flame from the heater or stove, from coming in contact with the rack, or with the bread carried thereby, thus eliminating detrimental effects on these which would otherwise be the result. It is to be understood that the toaster in its entirety may be constructed from any suitable material, and also vary in size and configuration without departing from the spirit of the invention. Manifestly, the construction is such, that the rack can be conveniently inserted within the receptacle or removed therefrom as the occasion may require, a knob 27 being provided on the cover 19 for this purpose.

It is believed that from the foregoing description that the nature and advantages of the invention will be readily apparent, although I desire to have it understood that I do not limit myself in this connection and that such changes may be resorted to when desired as fall within the scope of what is claimed.

Having thus described my invention, I claim:

A bread toaster comprising a receptacle of substantially rectangular formation in cross section, the bottom of said receptacle having an enlarged central opening, a baffle plate supported above said opening, a bread holder slidable through an opening in one end of the receptacle, means for supporting the holder in spaced relation to said baffle, said holder comprising a bottom plate and an end plate, and a plurality of wire racks of substantially U-shaped formation arranged vertically and in parallelism, and said end plate constituting a closure for the opening through which the holder enters the receptacle.

In testimony whereof I affix my signature.

TILLIE HARRINGTON.